US010728384B1

(12) United States Patent
Channakeshava et al.

(10) Patent No.: US 10,728,384 B1
(45) Date of Patent: Jul. 28, 2020

(54) SYSTEM AND METHOD FOR REDACTION OF SENSITIVE AUDIO EVENTS OF CALL RECORDINGS (71) Applicant: Intuit Inc., Mountain View, CA (US)

(72) Inventors: Girish Mallenahally Channakeshava, San Diego, CA (US); Matthew L. White, San Diego, CA (US)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 16/425,169

(22) Filed: May 29, 2019

(51) Int. Cl.
*H04M 3/42* (2006.01)
*H04M 3/22* (2006.01)
*G10L 15/05* (2013.01)
*G10L 15/08* (2006.01)

(52) U.S. Cl.
CPC ......... *H04M 3/42221* (2013.01); *G10L 15/05* (2013.01); *G10L 15/083* (2013.01); *H04M 3/2218* (2013.01); *G10L 2015/088* (2013.01)

(58) Field of Classification Search
CPC ....... G06Q 30/06; G10L 15/05; G10L 15/083; G10L 15/18; G10L 15/22; G10L 15/26; G10L 2015/088; G10L 15/00; G10L 15/07; G06F 3/048; G06F 15/173; G06F 17/27; H04M 3/2218; H04M 3/42221; H04M 3/51; H04M 1/64; H04M 1/66; H04M 3/00; H04M 3/42
USPC ..... 379/68, 88.01, 265.06, 265.07, 45, 67.1, 379/88.04, 265.02, 265.09
See application file for complete search history.

(56) References Cited

U.S. PATENT DOCUMENTS

| 8,204,180 | B1* | 6/2012 | Narayanan | G06F 21/6245 |
| | | | | 345/626 |
| 8,401,155 | B1* | 3/2013 | Barnes | H04M 3/51 |
| | | | | 379/67.1 |
| 9,185,219 | B2* | 11/2015 | Kumar | H04M 3/5166 |
| 9,489,376 | B2* | 11/2016 | Thomason | G06F 40/289 |
| 9,544,438 | B1* | 1/2017 | Andraszek | H04N 21/4542 |
| 9,641,676 | B1* | 5/2017 | Mandic | H04M 3/42221 |
| 9,686,242 | B2* | 6/2017 | Shrivastava | H04W 4/029 |
| 9,787,835 | B1* | 10/2017 | Pycko | H04M 7/1295 |
| 9,880,807 | B1* | 1/2018 | Haggerty | H04M 11/00 |
| 9,942,392 | B1* | 4/2018 | Ouimette | H04M 3/5166 |
| 10,079,935 | B1* | 9/2018 | Flores | G10L 15/26 |
| 10,382,620 | B1* | 8/2019 | Allen | H04M 1/72577 |
| 10,468,026 | B1* | 11/2019 | Newman | G10L 15/22 |
| 10,621,977 | B2* | 4/2020 | Pogorelik | G06F 16/685 |
| 2012/0027195 | A1* | 2/2012 | Shaffer | H04M 3/42221 |
| | | | | 379/265.09 |
| 2013/0129069 | A1* | 5/2013 | Peterson | H04M 3/5141 |
| | | | | 379/265.02 |
| 2013/0266127 | A1* | 10/2013 | Schachter | H04M 3/5175 |
| | | | | 379/88.01 |

(Continued)

*Primary Examiner* — Gerald Gauthier
(74) *Attorney, Agent, or Firm* — Paradice and Li LLP (57) ABSTRACT A call center records a voice conversation between a call center agent and a customer. A call recording of the voice conversation is transcribed. When a customer provides a call center agent with sensitive information, the sensitive information is detected from the transcribed voice conversation. Upon detection of the sensitive information, the sensitive information is redacted from the call recording. Alternatively, when sensitive information is detected, a notification is provided to the call center agent to pause and resume the recording.

20 Claims, 5 Drawing Sheets (56) References Cited

U.S. PATENT DOCUMENTS

| | | | | |
|---|---|---|---|---|
| 2014/0140497 A1* | 5/2014 | Ripa | ............... | H04M 3/5133 |
| | | | | 379/265.06 |
| 2015/0195406 A1* | 7/2015 | Dwyer | ............. | G06F 21/6254 |
| | | | | 379/265.07 |
| 2015/0281446 A1* | 10/2015 | Milstein | ............ | H04M 3/5166 |
| | | | | 379/88.01 |
| 2016/0203817 A1* | 7/2016 | Formhals | ............ | G10L 15/08 |
| | | | | 379/45 |
| 2018/0007204 A1* | 1/2018 | Klein | ............... | H04L 67/22 |
| 2018/0018959 A1* | 1/2018 | Des Jardins | .......... | G10L 15/32 |
| 2018/0233132 A1* | 8/2018 | Herold | ............. | G06F 1/329 |
| 2019/0088260 A1* | 3/2019 | Vachhani | ............ | G10L 15/22 |
| 2019/0355042 A1* | 11/2019 | Swierk | ............. | H04M 3/5166 |
| 2019/0355043 A1* | 11/2019 | Swierk | ............. | G06Q 30/0631 |
| 2020/0043487 A1* | 2/2020 | Moriya | ............. | G10L 15/28 |

\* cited by examiner

| 400 | 411 Start | 412 Utterance | 413 Stop | 414 Intent | 415 Redact |
|---|---|---|---|---|---|
| 421 | 0:00 | Hi, I am your agent. How can I help you? | 0:04 | N/A | No |
| 422 | 0:05 | I want to buy a widget. | 0:08 | N/A | No |
| 423 | 0:09 | I can help you. Can I get your payment information? | 0:18 | N/A | No |
| 424 | 0:19 | Yes. | 0:21 | N/A | No |
| 425 | 0:22 | What is your credit card number? | 0:26 | CC number | No |
| 426 | 0:27 | It is 9999-9999-9999-9999. | 0:31 | CC number & expiration date | Yes |
| 427 | 0:32 | Got it. What is the expiration date of your card? | 0:38 | CC expiration date | No |
| 428 | 0:39 | It says January 2020. | 0:42 | CC expiration date | Yes |
| 429 | 0:43 | Thanks, I'll place your order. | 0:48 | N/A | No |

SYSTEM AND METHOD FOR REDACTION OF SENSITIVE AUDIO EVENTS OF CALL RECORDINGS

BACKGROUND

While communication between customers and service providers frequently takes place online, there remains an ongoing need for voice communications between an agent of the service provider and a customer. An agent typically is a member of a service provider's call center, in which the task of the agent is to make or answer telephone calls. A call center agent may have the responsibility to make outbound telemarketing calls to attempt to sell to potential customers, to take customer service calls from users of a service provider's data management system, to provide technical support for problems related to a data management system, to make fundraising calls for nonprofit organizations, and various other agent responsibilities.

Such calls between agents and customers are often recorded. Such call recordings are typically for quality control purposes, and include the familiar greeting that states that the call may be monitored or recorded for quality assurance purposes. Recording calls is typically beneficial to enable call center managers to review the conversation between agents and customers to analyze performance and compliance issues. For example, if a customer is unhappy with a telephone call, a manager can review the recorded call and take remedial action for the dissatisfied customer.

At times, call center agents will collect credit card information to facilitate payments by customers. However, call centers that collect credit card information over the phone need to provide data security to protect such information. In a traditional call center, when a call is being recorded, the credit card information is also recorded. Such credit card information is considered sensitive information that, if exposed to unauthorized parties, could result in financial harm to the cardholder due to potential misuse of the credit card information. To prevent unauthorized exposure to the credit card information, call center recordings that contain credit card information are secured. For example, access to recordings may be restricted to certain roles, such as a manager of an agent. Limiting access to recordings typically reduces the benefits of the recordings due to the limited number of people who have access to such recordings. It would be preferable to not have to restrict access to any recording of a call with a customer.

Consequently, there is a significant need for a technical solution to the long-standing technical problem of protecting sensitive information within recordings of call center conversations while at the same time providing access to the recordings to all parties that would benefit from such access.

SUMMARY

Embodiments of the present disclosure provide a technical solution to the technical problem of recording sensitive information of call center conversations. The disclosed technical solution includes detecting the sensitive information from transcribed recordings using data indicating the intent to disclose sensitive information and automatically deleting or redacting the detected sensitive information from audio files.

As discussed in more detail below, embodiments of the present disclosure represent the technical solution to the technical problem of storing sensitive information within recordings of conversations. When a call between an agent and a customer is in a connected state, recording of the conversation is enabled and relative real-time transcribing of the recording is enabled. Utilizing machine-learning user intent detection, as is known in the art, sensitive information is detected within the transcription of the recording. When sensitive information is detected based on a determination of an intent of a user to verbally disclose sensitive information, the sensitive information is redacted from the audio file while leaving non-sensitive information unredacted. In another embodiment, when sensitive information is detected within the transcription of the recording, a pause button is displayed for the agent to activate. In this embodiment, when sensitive information is no longer being detected within the transcription of the recording, a resume button is displayed for the agent to activate. Sensitive information is detected based on a determination of the presence of one or more keywords that indicate that information in a transcription is sensitive. The sensitive information is then redacted from the recording.

Common reference numerals are used throughout the figures and the detailed description to indicate like elements. One skilled in the art will readily recognize that the above figures are examples and that other architectures, modes of operation, orders of operation, elements, and functions can be provided and implemented without departing from the characteristics and features of the invention, as set forth in the claims.

DETAILED DESCRIPTION

Embodiments will now be discussed with reference to the accompanying figures, which depict one or more exemplary embodiments. Embodiments may be implemented in many different forms and should not be construed as limited to the embodiments set forth herein, shown in the figures, and/or described below. Rather, these exemplary embodiments are provided to allow a complete disclosure that conveys the principles of the invention, as set forth in the claims, to those of skill in the art.

Overview

As discussed in more detail below, embodiments of the present disclosure represent the technical solution to the technical problem of avoiding the recording of sensitive information of call center conversations. The technical solution includes identifying and automatically redacting the sensitive information after detection.

With the present disclosure, customer intents are defined that represent categories of sensitive information about the customer. For example, an intent may be "Provide credit card number." The customer intents are defined by keywords, which may include n-grams, words, phrases, sentences, paragraphs, and other keywords that define a customer's intent. For example, some keywords may be "American Express," "Visa," "MasterCard," and other keywords that indicate an intent to provide a credit card number. The technical solution includes recording a voice conversation between a call center agent and a customer, in which the voice conversation contains at least one of the keywords. The recording of the voice conversation is transcribed into text. When a customer verbally provides the call center agent with sensitive information, the sensitive information is detected from the transcribed voice conversation based on at least one keyword of the transcription, in which the keyword defines an intent. Upon detection of the sensitive information, the sensitive information is automatically redacted from the audio file of the call recording. In an alternative embodiment, when sensitive information is detected, a notification is provided to the call center agent to pause the recording. In this alternative embodiment, when sensitive information is no longer detected, a notification is provided to the call center agent to resume the recording.

Figure 1:
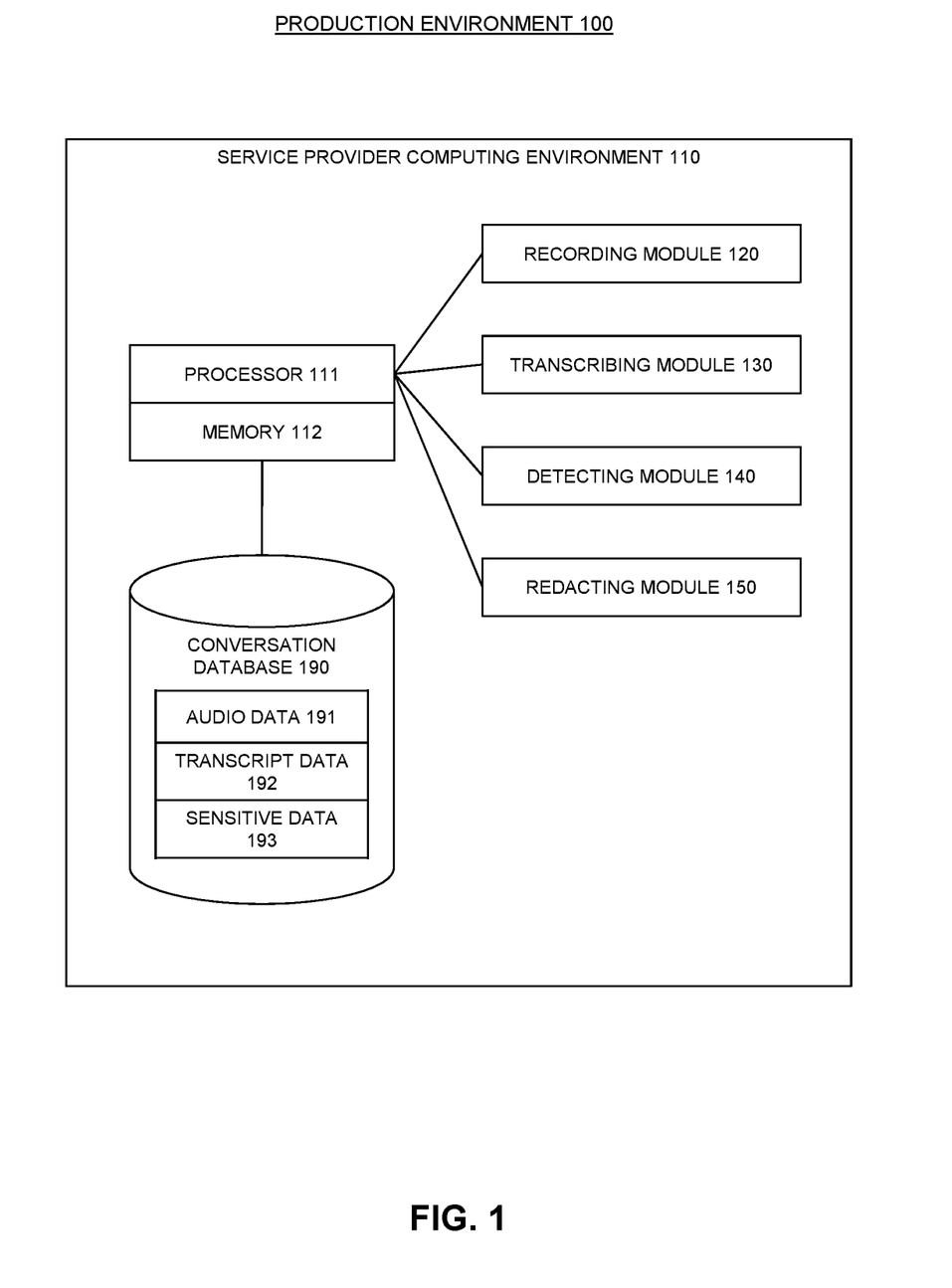
FIG. 1 is a functional block diagram of a production environment for sensitive audio event redaction.

FIG. 1 is a functional block diagram of a production environment 100 for sensitive audio event redaction. It is to be understood that the diagram of FIG. 1 is for exemplary purposes and is not meant to be limiting. In FIG. 1, the production environment 100 includes a service provider computing environment 110 comprising a recording module 120, a transcribing module 130, a detecting module 140, and a redacting module 150.

In FIG. 1, the production environment 100 includes a processor 111 and a memory 112. The memory 112 includes a conversation database 190 that stores data associated with conversations between first users and second users, such as customers and agents. The conversation database 190 includes audio data 191, transcript data 192, and sensitive data 193. The memory 112 includes instructions stored therein and which, when executed by the processor 111, performs a process. The production environment 100 includes instructions representing processes of the recording module 120, the transcribing module 130, the detecting module 140, and the redacting module 150, and other processes.

The recording module 120 records a conversation between at least two people, such as a call center agent and a customer. The recording module 120 generates an audio recording of the conversation. The conversation includes the customer verbally stating information that is sensitive to the customer, which is an audio event. Sensitive information can be traced back to a customer and, if disclosed, could cause harm to the customer. Sensitive information also comprises information that a customer desires to remain private. Sensitive information is also associated with a person's identity, such as names, social security numbers, driver's license numbers, passport numbers, dates and places of birth, biometric information, and other identity information. Sensitive information is also linked to customers, such as medical information, educational information, financial information, employment information, and other linked information. Sensitive information also includes demographic information such as ethnic origin, sexual orientation, political affiliations, criminal offense records, religious beliefs, and other demographic information.

Sensitive information may be associated with a business entity and include business information that poses a risk to a business if discovered by a competitor or the general public. Sensitive business information includes trade secrets, acquisition plans, financial data, supplier information, customer information, and other business information. Sensitive information may also be associated with a government body's classification of access restriction such as restricted information, confidential information, secret information, top secret information, and other forms of classified information.

Sensitive information can include payment card industry (PCI) information. PCI information is typically related to payment cards such as credit, debit, and cash cards and their associated transactions. Typically, credit card companies implement a payment card industry data security standard (PCI DSS) as policies and procedures to protect the security of cardholder information and credit card transactions. Typically, PCI DSS ensures that a call center that accepts, processes, stores, or transmits credit card information maintains a secure environment. Typically, cardholder data includes primary account numbers (PAN), cardholder names, expiration dates, service codes, and authentication codes such as card validation values (CVV) and personal identification numbers (PIN), and other cardholder data.

The call center agent can utilize a softphone to communicate with a customer. A softphone is an application program that enables voice over internet protocol (VoIP) calls from a computing device. A softphone application is utilized in conjunction with a headset and microphone connected to a sound card, and other softphone user interfaces such as a VoIP phone. A softphone connects with an internet telephony service provider (ITSP), an internet protocol private branch exchange (IP PBX), and other telecommunications services.

A softphone comprises a user interface that provides a platform for communication between a user and a softphone application. Such a platform comprises a graphical keypad of buttons representing numbers, audio input buttons such as volume control, audio output buttons, and other control buttons to manage calls. A softphone comprises a call processing module for processing calls that are placed and received in a particular protocol. The call processing module processes a set of codecs that allow voice data to be transferred over the internet through encoding between analog and digital formats.

The softphone includes call recording capabilities. Call recording is enabled prior to an agent's conversation with a customer. An agent may enable call recording by activating a record call button. Alternatively, call recording is enabled automatically based on the type of interaction being conducted with a customer. For example, a business group of a call center may determine that all calls with a customer related to sales of a product or service are to be recorded. It is to be understood that some calls between an agent and a customer are recorded and others are not.

An interactive voice response (IVR) module initiates a conversation between an agent and a customer. IVR provides a telephony menu system that interacts with a customer by enabling touchtone keypad selection and voice telephone input to be used for gathering information and routing of calls to the most appropriate agent within a call center. An IVR module provides automated services to a customer through an IVR dialog. The IVR module enables automated interactions such as mobile purchases, banking payments, retail orders, utilities, travel information, and other automated interactions.

The IVR module provides a prerecorded audio message to a customer that a call is being recorded. A call will be recorded for quality assurance purposes, such as to monitor the skills of a junior agent. A call may be recorded based on the menu path chosen by a customer through the IVR module. For example, if a customer navigates a menu path provided by the IVR module resulting in a customer wishing to place an order for a product, then the call will be recorded by the recording module 120 due to the conversation being considered a critical use case. As another example, if a customer navigates a menu path provided by the IVR module resulting in a customer wishing to check the status of an order that had already been placed, then the call will not be recorded by the recording module 120 due to the conversation not being considered a critical use case.

The audio data 191 is delivered to a speech analytics system (not shown) to analyze the audio data 191. The speech analytics system performs analytics on the audio data 191 in order to gain insights into the audio data 191. The speech analytics system determines the length of the calls, the amount of time agents took to respond to customer queries, the volume of redactions of the audio data 191, and other audio analytical information. Analytical information from the speech analytics system is used by managers of agents to make improvements to the operations of a call center.

The recording module 120 records a conversation between an agent and a customer. The softphone module detects that an agent is on a call with a customer and activates the recording module 120 to record the call. The conversation is recorded as audio data 191 that is stored at a conversation database 190. The audio data 191 is stored in an audio file format. The audio file format is based on an audio coding format, such as WAV, MP3, MPEG, and other audio coding formats. The audio data 191 can be stored as bitstream data in an audio coding format. The audio data 191 may comprise audio data embedded in a container with a defined storage layer. An audio codec can be utilized to perform encoding and decoding of bitstream data and the encoded bitstream data can be embedded in a container.

A transcribing module 130 generates transcript data 192 from the audio data 191 of the conversation database 190. The transcript data 192 is stored at the conversation database 190. It is to be understood that, although one conversation database 190 is depicted in FIG. 1 for illustrative purposes, there may be many conversation databases 190 having any combination of a plurality of storage components. If the recording module 120 generates audio data 191 from a conversation between an agent and a customer, the recording module 120 activates the transcribing module 130 to transcribe the audio data 191 into transcript data 192. The transcribing module 130 performs live transcription of the audio data 191 in relative real-time speech-to-text conversion.

The transcribing module 130 performs natural language processing (NLP) on the audio data 191 to generate the transcript data 192. The transcript data 192 generated by the transcribing module 130 includes keywords that were spoken in the conversation recorded as audio data 191. The transcribing module 130 generates timestamps of associated words, phrases, sentences, and other speech formulations of the audio data 191. Components of the transcript data 192 have an associated beginning timestamp indicating the time of the beginning of the keyword within the audio data 191 and has an associated ending timestamp indicating the time of the end of a component within the audio data 191. It is to be understood that a component of the transcript data 192 may be any speech formulation such as a single word, a plurality of words, a phrase, a sentence, a paragraph, and other speech formulations.

After a call between a customer and an agent is completed, a survey module delivers a survey to the customer. The survey is associated with the conversation that had been recorded. If the customer's returned survey contains a negative review of the agent, then the recording is made available to the manager of the agent. For example, if an agent receives a negative review from a survey, then the agent's manager may examine the recording in order to determine if the survey result is authentic, and if so, provide the agent with remedial actions, such as additional training. With this example, it is to be understood that it is undesirable for such recordings to include sensitive information for a manager to be able to hear.

After the transcribing module 130 generates transcript data 192 from the audio data 191 in relative real-time, the detecting module 140 detects sensitive data 193 within the transcript data 192. The detecting module 140 detects sensitive data 193 based on keywords and associated timestamps that were generated by the transcribing module 130. The sensitive data 193 comprises sensitive information, such as PCI information.

Sensitive data 193 may be detected by the detecting module 140 throughout the transcript data 192. Such detection is done by determining an intent of the customer, in which the intent represents a category of sensitive information that the customer intends to speak orally in a conversation. Each intent is defined by one or more keywords that represent the intent. An intent represents an action that fulfills a user's spoken request. An intent is a purpose or goal expressed by a user's keywords or utterances. A keyword spoken by a user invokes an intent. Keywords are the specific phrases that a user will speak when making a request, and an intent is a goal that the user is attempting to achieve.

As is known in the art, an intent can be determined from the transcript data 192 utilizing a machine learning model. Such machine learning models use algorithms including Linear Classifiers (Logistic Regression and Naive Bayes Classifier), Support Vector Machines, Decision Trees, Boosted Trees, Random Forest, Neural Networks, Nearest Neighbor, and other algorithms as known in the art at the time of filing, or as developed, or becomes available, after the time of filing. For example, a machine learning model may rank hypotheses according to a confidence score based on a weighting of words and phrases of a user's speech. Such a weighting is used by the machine learning model to classify utterances into keywords by the actions that the user wants to perform as designated by an intent. It is to be understood that a machine learning model may be incrementally trained as new forms of sensitive information is received.

For an example of detecting intents, a first intent may be detected after an agent asks the customer for a credit card number, and the customer provides the credit card number. Here, two keywords may define an intent of "credit card number" in which the first keyword may be the phrase "credit card number" and the second keyword may be a number that conforms to an industry standard for credit card numbers.

It is to be understood that, although the present disclosure includes embodiments of natural language processing that utilize keywords that define intents of a user, there are other embodiments that also perform natural language processing, as known in the art at the time of filing, or as developed, or becomes available, after the time of filing. For example, in an alternative embodiment, keywords may be utilized independently of a user's intent. For further example, other natural language processing detection capabilities, such as a repository of entities, may be defined to detect sensitive information, as known in the art at the time of filing, or as developed, or becomes available, after the time of filing.

In this example, a second intent may be detected after an agent asks the customer for an expiration date of the credit card, and the customer provides the expiration date. Here, two keywords may define an intent of "expiration date" in which the first keyword may be the phrase "date on the card" followed by a second keyword of a month and a year. In this example, a third intent may be detected after an agent asks for a validation number of the credit card, and the customer provides the validation number. Here, two keywords may define an intent of "validation number" in which the first keyword may be the phrase "security number on the back" followed by a second keyword of a number that conforms to an industry standard for validation numbers.

It is to be understood that each agent may formulate questions in their own unique way and that each customer may formulate answers in their own unique way, and that the detecting module 140 searches for keywords within the questions and answers in order to determine the occurrence of sensitive data 193 as categorized by an intent defined by keywords.

The detecting module 140 detects the beginning and end of sensitive data 193 based on keywords that define an intent within the transcript data 192. For example, if the detecting module 140 detects that an agent has stated the keyword "credit card," then the detecting module 140 may be configured to determine whether the customer's next statement contains a keyword of numbers that correspond to an industry defined primary account number of a payment card. In this example, after the detecting module 140 detects the completion of a primary account number, the detecting module 140 determines that the information after the numbers is not sensitive. In this example, the detecting module 140 may detect the agent stating "thanks" that indicates that a credit card number was received by the agent after the agent had requested the credit card number. Examples of keyword terms are primary account number (PAN), cardholder name, CVV code, expiration date, CAV2, CVC2, CVV2, CID, PIN, and other keyword terms.

As another example, if the detecting module 140 detects that an agent has stated the keyword "expiration date," then the detecting module 140 may be configured to determine whether the customer's next statement contains a keyword of numbers or words that correspond to a date format. In this example, the keyword "expiration date" may not only indicate that sensitive data of a credit card expiration will follow from a customer's response, but also that the preceding statement by the customer likely contained a credit card number, as most agents ask for an expiration date after receiving a credit card number.

The redacting module 150 redacts the sensitive data 193 from the audio data 191. The redacting module 150 performs the redaction by removing a portion of the audio data 191 associated with the sensitive data 193. The redacting module 150 performs the redaction by replacing a portion of the audio data 191 associated with the sensitive data 193 with a redaction message, such as the spoken word "redacted," silence, and other redacted messages. A portion of the audio data 191 to be redacted is determined based on a beginning timestamp and an ending timestamp, in which the sensitive data 193 is contained within the beginning timestamp and the ending timestamp.

Exemplary Environment

Figure 2:
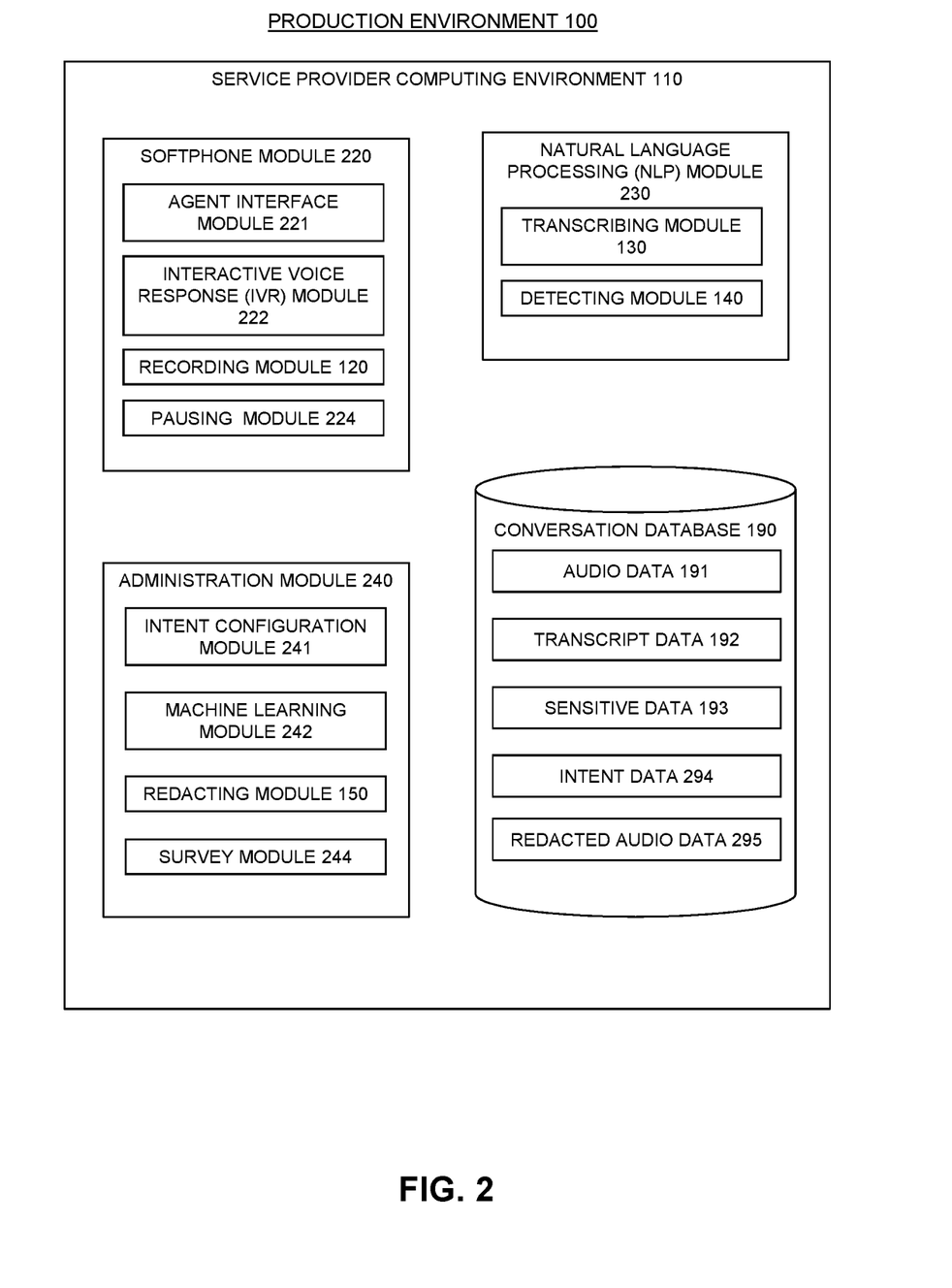
FIG. 2 is a functional block diagram of a production environment for sensitive audio event redaction.

The technical solution to the technical problem of recording sensitive information includes redacting the sensitive information from an audio file after detection of the sensitive information within a transcript of a recording. FIG. 2 is a functional block diagram of the production environment 100 for sensitive audio event redaction. It is to be understood that the diagram of FIG. 2 is for exemplary purposes and is not meant to be limiting. Referring to FIGS. 1 and 2 together, the production environment 100 includes the service provider computing environment 110, which includes a softphone module 220, a natural language processing (NLP) module 230, an administration module 240, and a conversation database 190.

As shown in FIG. 2, the softphone module 220 resides in the service provider computing environment 110. Although not shown, the softphone module 220 may reside in a third-party computing environment that is connectively coupled to the service provider computing environment 110. The softphone module 220 may include any softphone functionality as known in the art at the time of filing, or as developed, or becomes available, after the time of filing. The softphone module 220 includes an agent interface module 221. The agent interface module 221 provides a platform for communication between an agent and the softphone module 220. The agent interface module 221 provides audio input that is operational with a microphone and audio output that is operational with a speaker. The agent interface module 221 includes a graphical numeric pad for dialing telephone numbers. The agent interface module 221 includes control buttons to manage calls between an agent and a customer.

The softphone module 220 includes an interactive voice response (IVR) module 222 that interacts with a customer prior to a connection with an agent. The IVR module 222 may include any IVR functionality as known in the art at the time of filing, or as developed, or becomes available, after the time of filing. The IVR module 222 provides an initial interaction with a customer in order to gather information from the customer and route the customer's call to the appropriate agent. For example, the IVR module 222 may provide to a customer a welcoming message of "Thank you for calling us" followed by a choice for prompts such as "Press 1 for sales and 2 for support." The IVR module 222 accepts information from a customer both as voice telephone input and as touch-tone keypad selection.

The IVR module 222 incorporates prerecorded voice messages and prompts that include a telephonic menu for handing off a call to an agent who can view any data gathered by the IVR module 222. Based on the choices selected by a customer in a menu structure, a determination can be made by the softphone module 220 whether or not a call is to be recorded. For example, if a call is routed based on a menu path for providing information, such as an address of a business, such a call may not be recorded. Alternatively, with this example, if a call is routed based on a menu path for placing orders, such as paying for a purchase, such a call may be recorded.

The softphone module 220 includes the recording module 120. The recording module 120 may include any audio file generation functionality as known in the art at the time of filing, or as developed, or becomes available, after the time of filing. The recording module 120 generates audio data 191 based on the oral conversation between an agent and a customer, which are sound waves of human speech. The audio data 191 is stored at the conversation database 190. The audio data 191 represents an audio file of a recording. Such an audio file has a recording time, which can be described in a format of hours, minutes, and seconds, such as HH:MM:SS. For example, at the start of the recording, the audio file is at the 0:00:00 time mark and if a recording is ten minutes, then the end of the recording is at the 0:10:00 time mark. Such recording of time marks enables the generation of timestamps of utterances of the audio data 191. It is to be understood that there are many formats for a timestamp in addition to the HH:MM:SS format. For example, a timestamp format may comprise the number of seconds from an epoch date, such as Jan. 1, 1970. With this timestamp format, a time stamp of May 17, 2016 at 9:25:12 AM would be 1463477112 seconds since the epoch date. It is to be understood that, in addition to the disclosed timestamps, any form of demarking a portion of audio data may be utilized as known in the art at the time of filing, or as developed, or becomes available, after the time of filing.

The softphone module 220 includes a pausing module 224. The pausing module 224 displays a pause button to an agent when it is determined that a sensitive audio event has occurred, such as when credit card information is communicated in a call. The pausing module displays the pause button in response to a pause notification from the redacting module 150. When the pause button is activated by an agent, a start timestamp is generated by the pausing module 224 that indicates when a redaction of the audio data 191 is to begin. After the pause button is activated by an agent, a resume button is displayed to the agent. The pausing module 224 displays the resume button in response to a resume notification from the redacting module 150. When the resume button is activated by an agent, a stop timestamp is generated by the pausing module 224 that indicates when a redaction of the audio data 191 is to end.

The softphone module 220 is communicatively coupled to the NLP module 230. As shown in FIG. 2, the NLP module 230 resides in the service provider computing environment 110. Although not shown, the NLP module 230 may reside in a third-party computing environment that is connectively coupled to the service provider computing environment 110. The NLP module 230 may include any NLP functionality as known in the art at the time of filing, or as developed, or becomes available, after the time of filing.

The NLP module 230 includes the transcribing module 130. The transcribing module 130 may include any transcribing functionality as known in the art at the time of filing, or as developed, or becomes available, after the time of filing. As the recording module 120 records audio data 191, the transcribing module 130 transcribes the audio data 191. The transcribing module 130 generates transcript data 192 from the audio data 191. The transcript data 192 is a textual representation of the audio data 191. The transcribing module 130 includes an Automatic Speech Recognition (ASR) engine (not shown) that is utilized to convert voice of the audio data 191 to text of the transcript data 192. The transcribing module 130 includes timestamps within the transcript data 192. A start timestamp is placed within the transcript data 192 to show the starting point of a portion of text, and a stop timestamp is placed within the transcript data 192 to show the stopping point of a portion of text.

The NLP module 230 includes a detecting module 140 to detect sensitive information based on an intent of a customer. The detecting module 140 may include any intent detecting functionality as known in the art at the time of filing, or as developed, or becomes available, after the time of filing. The detecting module 140 includes a Natural Language Understanding (NLU) engine (not shown) that is utilized to recognize the meaning of the text that is generated for the transcript data 192. The detecting module 140 detects sensitive information from the intent data 294 of the conversation database 190. The detecting module 140 generates sensitive data 193 based on intent data 294. The sensitive data 193 represents sensitive information that is to be redacted. The detecting module 140 includes the sensitive data 193 with the transcript data 192.

The detecting module 140 also includes a start timestamp and a stop timestamp to indicate the beginning and end of the sensitive data 193 within the audio data 191. The detecting module 140 processes the transcript data 192 for utterances of a conversation and determines which utterances describe an intent based on the intent data 294. For example, an intent may be to say a credit card number, and the detecting module 140 determines when the utterance associated with the intent began and when it ended. The detecting module 140 generates a start timestamp based on the beginning of the intent and generates a stop timestamp based on the ending of the intent. It is to be understood that if the detecting module 140 does not detect sensitive information within the transcript data, such as when no credit card number was provided by a customer, then the detecting module 140 does not generate sensitive data 193 and no redaction is performed for that particular audio data 191.

The detecting module 140 detects an intent from a variety of utterances by agents, who may request sensitive information from customers in a variety of ways. When the detecting module 140 detects an intent, it generates sensitive data 193 that represents that an intent was invoked within the conversation between an agent and a customer. The detecting module 140 also generates a start timestamp and a stop timestamp for each intent represented by the sensitive data 193. After the call between the agent and the customer is complete, and the applicable audio data 191 is stored in the conversation database 190, then the redacting module 150 redacts the portion of the audio data 191 that is associated with the sensitive data 193 based on the respective start and stop timestamps of each detected intent.

The detecting module 140 uses weighted probabilities to determine whether an intent has been stated in a conversation between an agent and a customer. Such weighted probabilities can be based on the distance between one or more words associated with an intent. For example, if three words of "credit," "card," and "number" are adjacent to each other, the probability is high that the intent of these three words is associated with a credit card number. For another example, if those three words each have a different word between them, then the probability that these three words are associated with a credit card number is reduced. In this way, n-grams, such as bigrams and trigrams, are utilized to measure the distance between words by the detecting module 140 in order to determine the probability that an utterance is an intent.

An intent term may be "routing number" with a keyword phrase of "What is your bank routing number?" Alternatively, an intent term may be "checking account number" with a keyword phrase of "What is your checking account number?" Alternatively, an intent term may be "credit card number" with a keyword phrase of "What is your card expiration date?" Alternatively, an intent term may be "CVV" with a keyword phrase of "What is the CVV number on the back of your card?"

It is to be understood that the recording module 120 is generating audio data 191 in relative real-time as a conversation is occurring between an agent and a customer. It is to be further understood that the transcribing module 130 is generating transcript data 192 in relative real-time based on the audio data 191 which is being generated in relative real-time. As the transcript data 192 is generated in relative real-time by the transcribing module 130, the detecting module 140 is generating sensitive data 193 in relative real-time based on the transcript data 192. Thus, while there may be an actual delay between when an utterance is spoken by an agent or a customer and when sensitive data 193 is generated by the detecting module 140, such a delay is generally imperceptible or unnoticeable by the agent and the customer.

If the detecting module 140 detects an intent of an agent asking a customer for a credit card number, then the pausing module 224 will display a pause button in relative real-time to the agent to cause a start timestamp to be generated if the pause button is activated by the agent. It is to be understood that generating a start timestamp after the agent asks a customer for a credit card number would likely result in the next utterances by the customer to be redacted based on the start timestamp, as those next utterances are likely to include sensitive information of a credit card number. If the detecting module 140 detects an intent of a customer providing a credit card number to the agent, then the pausing module 224 will display a resume button in relative real-time to the agent to cause a stop timestamp to be generated if the resume button is activated by the agent, indicating that the credit card number was spoken and the remaining utterances by the customer do not need to be redacted. In this example, the redacting module 150 performs the redaction based on a pair of intents, where the opening intent is based on an agent requesting a credit card number and the closing intent is based on a customer providing a credit card number.

To continue with the preceding example, the preceding closing intent may also be utilized as an opening intent for a second redaction. For example, the preceding example of a customer providing a credit card number could be an opening intent that the customer will next provide an expiration date, and the pausing module 224 will accordingly display the pause button again. After the detecting module 140 detects the expiration date, then such is considered a closing intent, and the pausing module 224 will accordingly display the resume button again. It is to be understood that several utterances by an agent and a customer may cause the determination of a chain of pairs of intents comprising intents that act as both closing intents and opening intents of the pairs, and each pair of intents is represented by respective start and stop timestamps. Some examples of a chain of pairs of intents can be cardholder name paired with zip code, cardholder name paired with CVV code, credit/debit card number paired with expiration date, credit/debit card number paired with CVV code, credit/debit card number paired with zip code, bank routing number paired with personal bank account number, and other intent pairs.

The administration module 240 includes an intent configuration module 241 that enables configuration of the intent data 294. The intent configuration module 241 provides a user interface to an administrator to configure the intent data 294. For example, an administrator can define an intent of a credit card number. In this example, an intent of credit card number could be prefaced by keywords said by an agent related to a credit card number such as "credit card," "payment card," "account number," and other credit card number inquiry keywords. Such an intent can be further defined to expect a customer to respond with a numeric value that matches the industry coding of a credit card number.

With this example, a second intent can be defined in which, after detecting a credit card number in the first intent, the second intent definition would expect an agent to state keywords related to an expiration date of a credit card such as "expiration date," "expiry," "month and year," and other expiration date inquiry keywords. Such a second intent can be further defined to expect a customer to respond with a month and a year that matches the industry coding of an expiration date.

With this example, a third intent can be defined in which, after detecting a credit card expiration date in the second intent, the third intent definition would expect an agent to state keywords related to a validation number such as "security code," "number on back of card," "CVV," and other validation number keywords. Such a third intent can be further defined to expect a customer to respond with a numeric value that matches the industry coding of a validation number.

With this example, having defined three intents related to sensitive information, the detecting module 140 can detect three instances of sensitive information from the transcript data 192. Those three instances of sensitive information are represented by sensitive data 193, which includes respective timestamps that indicate the three respective start timestamps and stop timestamps of the sensitive information of credit card number, expiration data, and validation number within the audio data 191.

In another example, a consolidated intent can be defined with the intent configuration module 241. In this example, when an intent of credit card information is determined, this intent includes an expiration date and a validation code to be included by the customer with the credit card number. In this example, when an agent asks a customer for a credit card number, the customer may respond not only with the prompted credit card number, but may also include the expiration data and the validation number in anticipation of the agent needing this information. In this example of a consolidated intent, the intent configuration module 241 enables intent data 294 to be defined that is a single intent for all three components of such sensitive information. In this example, the detecting module 140 would detect such a consolidated intent and generate a single start timestamp for the beginning of the credit card number and a single stop timestamp for the end of the validation number. Such single start and stop timestamps in this example would indicate the portion of the audio data 191 to be redacted that would encompass redaction of the credit card number, the expiration date, and the validation number.

An intent is something that a speaker who speaks an utterance wants to accomplish. For example, a customer may have an intent to provide a call center agent with a credit card number. The intent configuration module 241 is supplied with sample keywords that define an intent, and each intent can be described textually as well as be associated with a unique intent identifier. Furthermore, the detecting module 140 associates each intent with a start timestamp and a stop timestamp that provides information about a portion of the audio data 191 to be redacted.

In some embodiments, the intent configuration module 241 includes associating an intent with a menu path followed by the IVR module 222. For example, a menu path may lead to a call center agent who is a member of a business unit that does not wish to redact certain sensitive information, while another menu path may lead to a call center agent who is a member of a business unit that does wish to redact that sensitive information.

The administration module 240 includes a machine learning module 242 that improves the intent data 294. The machine learning module 242 utilizes a machine learning engine (not shown) to improve the intent data 294 that had been defined by an administrator via the intent configuration module 241. The machine learning module 242 may be considered beneficial to improve detection of intents that an administrator had not considered. For example, in the normal course of business, an agent would be expected by an administrator to ask for a credit card number, an expiration date, and a validation number, in that order. However, in this example, an agent may reverse the order and ask for a validation number first, an expiration date second, and a credit card number third. In this example, the machine learning module 242 would receive feedback from an agent via the pausing module 224 that a credit card number should have been detected, and the machine learning module 242 updates the intent data 294 with such information.

The machine learning module 242 includes a model (not shown) that is continuously trained based on the speech patterns of agents and customers. It is to be understood that an agent may request sensitive information from a customer in a manner that is not predicted currently with the intent data 294. In this situation, the detecting module 140 would not detect that sensitive information is being provided by a customer. However, in this scenario, the customer understood that the agent asked for sensitive information and provided sensitive information to the agent. In this scenario, the machine learning module 242 would recognize that a credit card number was provided by the customer, based on the formatting of the number spoken by the customer. The machine learning module 242 would learn from what was said by the agent to solicit this sensitive information, and based on retraining a model, would improve the intent data 294 to detect sensitive information from the speech pattern of an agent. In one embodiment, machine learning includes artificial intelligence operations, regression, logistic regression, decision trees, artificial neural networks, support vector machines, linear regression, nearest neighbor methods, distance-based methods, naive Bayes, linear discriminant analysis, k-nearest neighbor algorithm, search query classification, and other machine learning operations.

Furthermore, when the machine learning module 242 detects sensitive information for an intent that was detected, it can instruct the detecting module 140 that a detection has been made and the detecting module 140 will generate sensitive data 193 with a stop timestamp that correlates to the time when the instruction was received, and will create a start timestamp that correlates to ten seconds prior to that time, or another period of time as determined by an administrator. It is to be understood that the prior example of ten seconds is an approximate time period to redact sensitive information uncovered by the machine learning module 242 as it is continuously learning. If the detecting module 140 does not detect an intent, then an administrator will manually examine the audio data 191 for applicable keywords, and utilize the machine learning module 242 to retrain a model so that the intent will be detected in the future.

The administration module 240 includes a redacting module 150 that redacts the sensitive data 193 from the audio data 191. The redacting module 150 receives the sensitive data 193 from the detecting module 140 on a continuous basis. The sensitive data 193 includes an intent with a start timestamp and a stop timestamp of the intent. The intent is detected by the detecting module 140 based on keywords that are included in the intent data 294. The redacting module 150 receives the sensitive data 193 that represents a detected intent of an utterance, in which the utterance contains sensitive information. The received sensitive data 193 includes a start timestamp and stop timestamp of the detected intent. The received sensitive data 193 includes a description of the intent, such as the type of sensitive information of the intent, and a data type if applicable, such as a date data type.

In a first embodiment, the redacting module 150 redacts the portion of the audio data 191 that is associated with the sensitive data 193. Redaction is replacing original audio of the audio data 191, which contains sensitive information, with new audio, which does not contain sensitive information. The redaction can have a variety of forms such as replacing the sensitive data 193 with white noise, a repeated message such as "redaction," music, a repetitive beeping sound, and other redaction audio messages.

In a second embodiment, the redacting module 150 is communicatively coupled to the pausing module 224 of the softphone module 220. The redacting module 150 transmits notifications to the pausing module 224 to display a pause button to the agent. If the agent presses the pause button, then the redacting module 150 redacts the portion of the audio data 191 that is associated with activation of a pause button as a start timestamp and the activation of a resume button as a stop timestamp. In the second embodiment, such redaction can occur after the resume button is activated or after the call is completed between the agent and the customer. Displaying a pause button via the pausing module 224 enables the agent to validate the detection performed by the detecting module 140. For example, if the agent does not activate the pausing button when indicated, this indicates that sensitive information was not provided by a customer. In this case, the machine learning module 242 may use that information to make adjustments to the intent data 294.

The redacting module 150 includes a filter module (not shown) that determines whether or not an intent is to be redacted. For example, a particular business unit of a call center may decide that social security numbers are not to be redacted, while another business unit may decide that a social security number is to be redacted. If an intent of a social security number is detected by the detecting module 140, then the filter module is utilized by the redacting module 150 to determine whether the detected intent is redacted from the audio data 191.

The redacting module 150 redacts the sensitive data 193 after a call is completed based on one or more pairs of start and stop timestamps of the sensitive data 193. Alternatively, the redacting module 150 redacts the sensitive data 193 in relative real-time from the audio data 191 based on when a pair of start and stop timestamps is generated. The redacting module stores a redacted version of the audio data 191 as redacted audio data 295 at the conversation database 190. Accordingly, the redacted audio data 295 is available for replay by a party to be able to listen to a redacted version of the recording of the conversation.

The administration module 240 includes a survey module 244 that generates a survey for a customer based on the transcript data 192. Based on the survey results, a manager can replay an audio file from the audio data 191. It is to be understood that, with the disclosed embodiments, sensitive information has been redacted from the audio data 191 prior to the manager replaying an audio file.

The survey module 244 generates a survey to a customer after a customer's call with an agent is completed. Each call with a customer and an agent has a unique identifier associated with it, and this unique identifier is also associated with the respective audio data 191 and the survey delivered to the customer. If the customer reports in the survey a negative experience, the survey module 244 delivers the survey results to an applicable manager. Included with the survey results is a link to the applicable audio data 191 based on the unique identifier of the call. Accordingly, the manager will be able to listen to the audio file of the conversation that received a negative survey review. It is to be understood that, with the disclosed embodiments, the manager will not hear sensitive information within the applicable audio data 191 because the redacting module 150 will have redacted such sensitive information.

Figure 3:
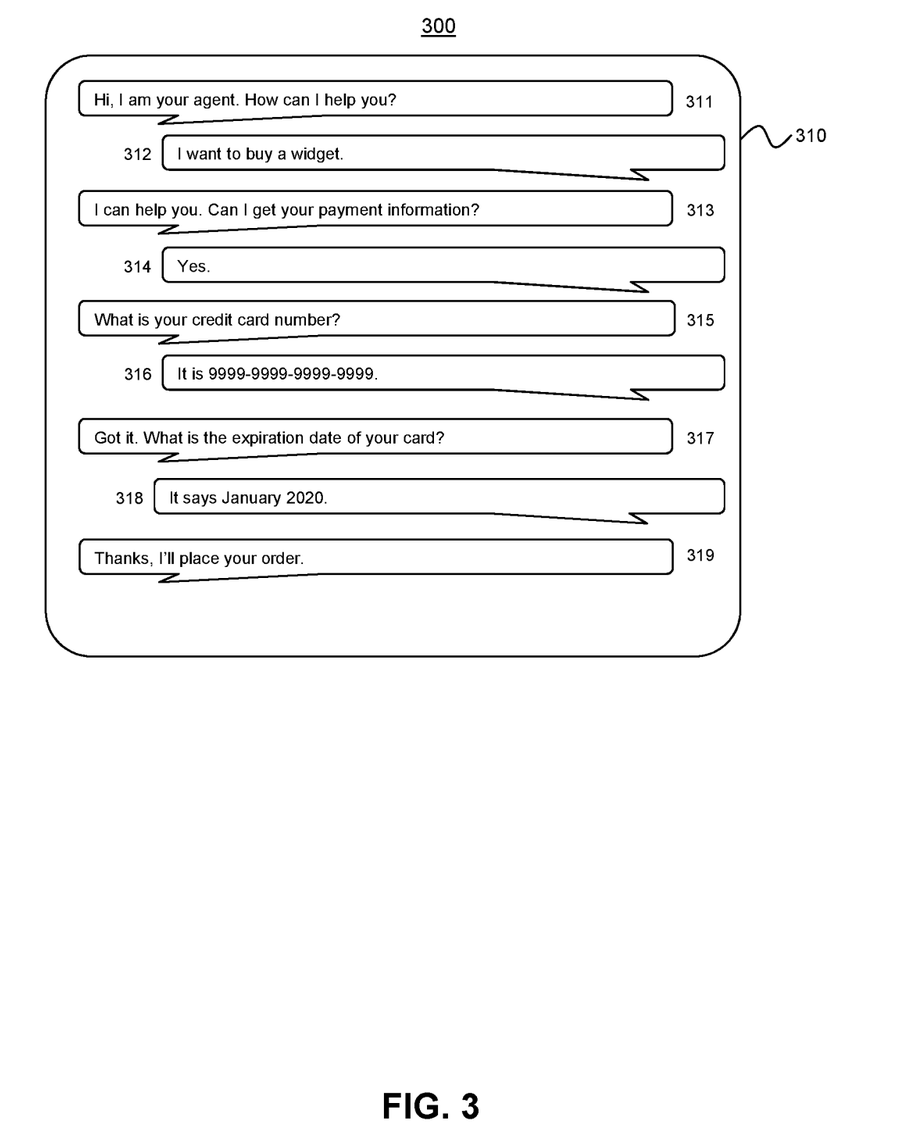
FIG. 3 is an example of a conversation between an agent and a customer.

FIG. 3 is an example 300 of a conversation 310 between an agent and a customer. Referring to FIGS. 2 and 3 together, the conversation 310 illustrates a dialog between an agent and a customer after the call has been routed to the agent by the IVR module 222. In the example 300, the agent is interfacing with the agent interface module 221 of the softphone module 220 to communicate with the customer.

The conversation 310 begins with the agent making an utterance 311 of "Hi, I am your agent. How can I help you?" In the example 300, the recording module 120 begins recording this utterance 311 at time 0:00 to generate audio data 191. As the audio data 191 is being generated, the transcribing module 130 begins generating transcript data 192 to convert the audio of the utterance 311 into text. The conversation 310 continues with the customer responding with an utterance 312 of "I want to buy a widget." This utterance 312 is recorded at time 0:05.

Next, the agent makes an utterance 313 of "I can help you. Can I get your payment information?" The utterance 313 is recorded at time 0:09. Then the customer responds with the utterance 314 of "Yes." This is recorded at time 0:19. Both the utterance 313 and the utterance 314 are recorded by the recording module 120 and transcribed by the transcribing module 130.

With the conversation 310, the agent makes an utterance 315 of "What is your credit card number?" This is recorded at time 0:22. The customer responds with an utterance 316 of "It is 9999-9999-9999-9999." The utterance 316 is recorded at time 0:27. In this example 300, the detecting module 140 detects an intent of a credit card number based on the intent data 294. In the example 300, an administrator had utilized the intent configuration module 241 to define an intent of "credit card number" with keywords spoken by an agent followed by a number in a credit card number format spoken by a customer, which is represented as intent data 294. In this example 300, the detecting module 140 generates sensitive data 193 that represents the detected intent of a credit card number with a start timestamp of 0:27 and a stop timestamp of 0:31, which is the time at the end of the credit card number spoken by the customer. The redacting module 150 will then redact the portion of the audio data 191 from the start timestamp of 0:27 to the stop timestamp of 0:31, which redacts the credit card number from the audio file.

After collecting the credit card number in the conversation 310, the agent makes an utterance 317 of "Got it. What is the expiration date of your card?" This is recorded at time 0:32. The customer responds with an utterance 318 of "It says January 2020." The utterance 318 is recorded at time 0:39. In this example 300, the detecting module 140 detects an intent of a credit card expiration date based on the intent data 294. In the example 300, an administrator had utilized the intent configuration module 241 to define an intent of "credit card expiration date" with keywords spoken by an agent followed by a date in a format of month and year spoken by a customer, which is represented as intent data 294. In this example 300, the detecting module 140 generates sensitive data 193 that represents the detected intent of a credit card expiration date with a start timestamp of 0:39 and a stop timestamp of 0:42, which is the time at the end of the credit card expiration date spoken by the customer. The redacting module 150 will then redact the portion of the audio data 191 from the start timestamp of 0:39 to the stop timestamp of 0:42, which redacts the credit card expiration date from the audio file.

Last for the example 300, the conversation 310 ends with the agent making an utterance 319 of "Thanks, I'll place your order." This utterance is recorded at time 0:43 and ends at time 0:48. In this example 300, the detecting module 140 does not detect an intent from the utterance 319 because the agent did not state any sensitive information, as defined by the intent data 294.

It is to be understood that an alternative embodiment of the example 300 provides for the redacting module 150 communicating with the pausing module 224 to display a pause button at times 0:27 and 0:39 and to display a resume button at times 0:31 and 0:42. In this alternative embodiment, the redacting module 150 redacts from the audio data 191 based on the time at which the pause and resume buttons are activated by the agent.

Figure 4:
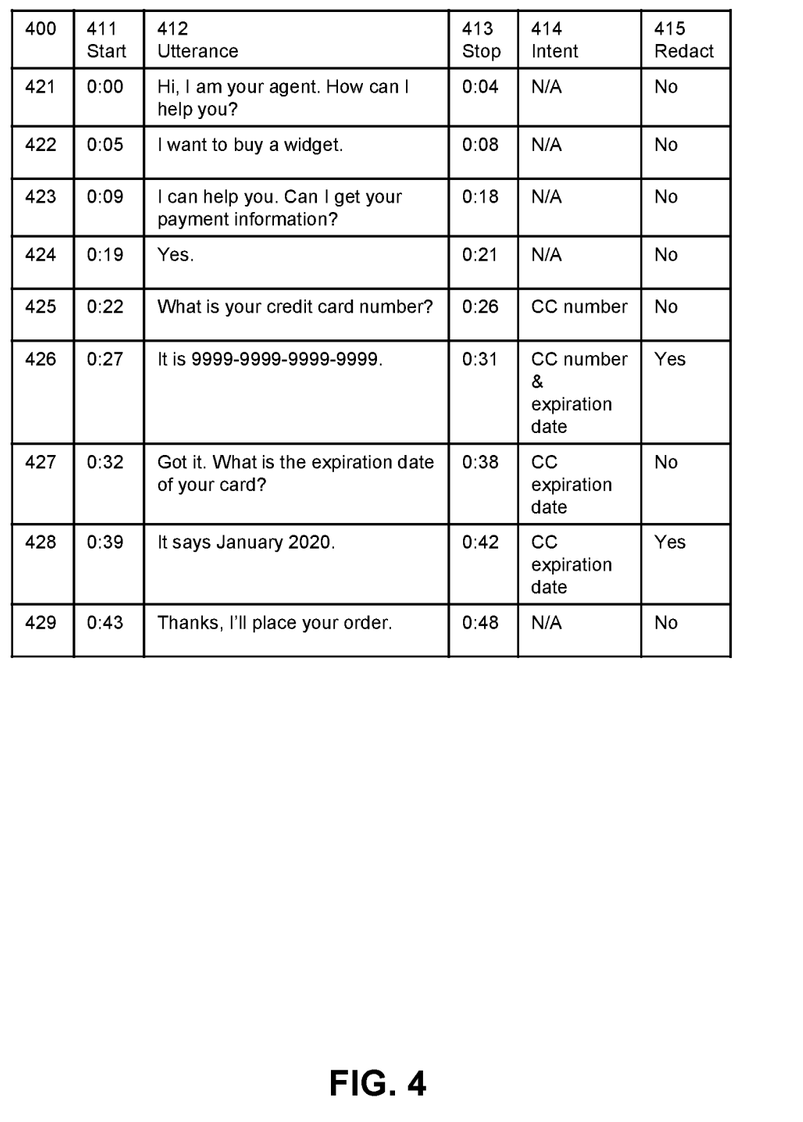
FIG. 4 is an example table of a transcribed conversation between an agent and a customer.

FIG. 4 is an example table 400 of a transcribed conversation between an agent and a customer. Referring to FIGS. 2, 3, and 4 together, the table 400 includes a column 411 that represents a start timestamp and a column 413 that represents a stop timestamp for the transcribed text of an utterance of a conversation. The conversations are represented by column 412 that had been generated as audio data 191 by the recording module 120. The text of column 412 is represented by the transcript data 192 that was generated by the transcribing module 130 based on the audio data 191. Column 414 represents a description of an intent as represented by the intent data 294 as defined via the intent configuration module 241. Column 415 represents whether the text of column 412 is determined to be sensitive information by the detecting module 140 utilizing the intent data 294. If it is detected to be sensitive information, then the detecting module 140 generates sensitive data 193 that indicates what will be redacted by the redacting module 150.

Row 421 includes the text of an utterance in column 412 of "Hi, I am your agent. How can I help you?" In this example, the start timestamp 411 is 0:00 and the stop timestamp 413 is 0:04. Column 414 shows that the text does not contain any keywords that would indicate that the utterance contains an intent to disclose sensitive information. Accordingly, the column 415 shows that there is no redaction of this utterance.

Row 422 includes the text of an utterance in column 412 of "I want to buy a widget." In this example, the start timestamp 411 is 0:05 and the stop timestamp 413 is 0:08. Column 414 shows that the text does not contain any keywords that would indicate that the utterance contains an intent to disclose sensitive information. Accordingly, the column 415 shows that there is no redaction of this utterance.

Row 423 includes the text of an utterance in column 412 of "I can help you. Can I get your payment information?" In this example, the start timestamp 411 is 0:09 and the stop timestamp 413 is 0:18. Column 414 shows that the text does not contain any keywords that would indicate that the utterance contains an intent to disclose sensitive information. Accordingly, the column 415 shows that there is no redaction of this utterance.

Row 424 includes the text of an utterance in column 412 of "Yes." In this example, the start timestamp 411 is 0:19 and the stop timestamp 413 is 0:21. Column 414 shows that the text does not contain any keywords that would indicate that the utterance contains an intent to disclose sensitive information. Accordingly, the column 415 shows that there is no redaction of this utterance.

Row 425 includes the text of an utterance in column 412 of "What is your credit card number?" In this example, the start timestamp 411 is 0:22 and the stop timestamp 413 is 0:26. Column 414 shows that the text contains at least one keyword that indicates that the utterance may indicate an intent to disclose sensitive information. In this example, the intent is defined such that the following utterance is to be examined for sensitive information in that the utterance in row 425 indicates that a credit card number is being solicited. Accordingly, it needs to be determined whether row 426 contains a credit card number that is being provided, which would be considered sensitive information. Because sensitive information has not yet been disclosed, the column 415 shows that there is no redaction of this utterance in row 425.

Row 426 includes the text of an utterance in column 412 of "It is 9999-9999-9999-9999." In this example, the start timestamp 411 is 0:27 and the stop timestamp 413 is 0:31. Column 414 shows that the text contains at least one keyword that indicates that the utterance contains an intent to disclose sensitive information. In this example, the intent is defined based on the prior utterance in row 425 containing the phrase "credit card number" and the current utterance in row 426 containing digits in an industry defined format for credit cards. In this example, as shown in column 415, the text for row 426 is redacted based on the start timestamp of column 411 and the stop timestamp of column 413.

Column 414 of row 426 also indicates that an intent of credit card expiration date is being triggered. In this example, when a credit card number is received, an intent can be defined that sensitive information of an expiration date may follow the receipt of a credit card number.

Row 427 includes the text of an utterance in column 412 of "Got it. What is the expiration date of your card?" In this example, the start timestamp 411 is 0:32 and the stop timestamp 413 is 0:38. Column 414 shows that the text contains at least one keyword that indicates that the utterance may represent an intent to disclose sensitive information. In this example, the intent is defined such that the prior utterance in row 426 is a number in a format accepted by the credit card industry and the following utterance is to be examined for sensitive information in that the utterance in row 427 indicates that a credit card expiration date is being solicited. It is then further determined whether row 428 contains a credit card expiration date that is being provided, which would be considered sensitive information. Because sensitive information has not yet been disclosed, the column 415 shows that there is no redaction of the utterance in row 427.

Row 428 includes the text of an utterance in column 412 of "It says January 2020." In this example, the start timestamp 411 is 0:39 and the stop timestamp 413 is 0:42. Column 414 shows that the text contains at least one keyword that indicates that the utterance contains an intent to disclose sensitive information. In this example, the intent is defined based on the prior utterances in row 426 containing a credit card number and in row 427 containing the phrase "credit card number." Further, the current utterance in row 428 contains a date in a month and year format, which is an industry format for expiration dates of credit cards. In this example, as shown in column 415, the text for row 428 is redacted based on the start timestamp of column 411 and the stop timestamp of column 413.

Row 429 includes the text of an utterance in column 412 of "Thanks. I'll place your order." In this example, the start timestamp 411 is 0:43 and the stop timestamp 413 is 0:48. Column 414 shows that the text does not contain any keywords that would indicate that the utterance contains an intent to disclose sensitive information. Accordingly, the column 415 shows that there is no redaction of this utterance.

Figure 5:
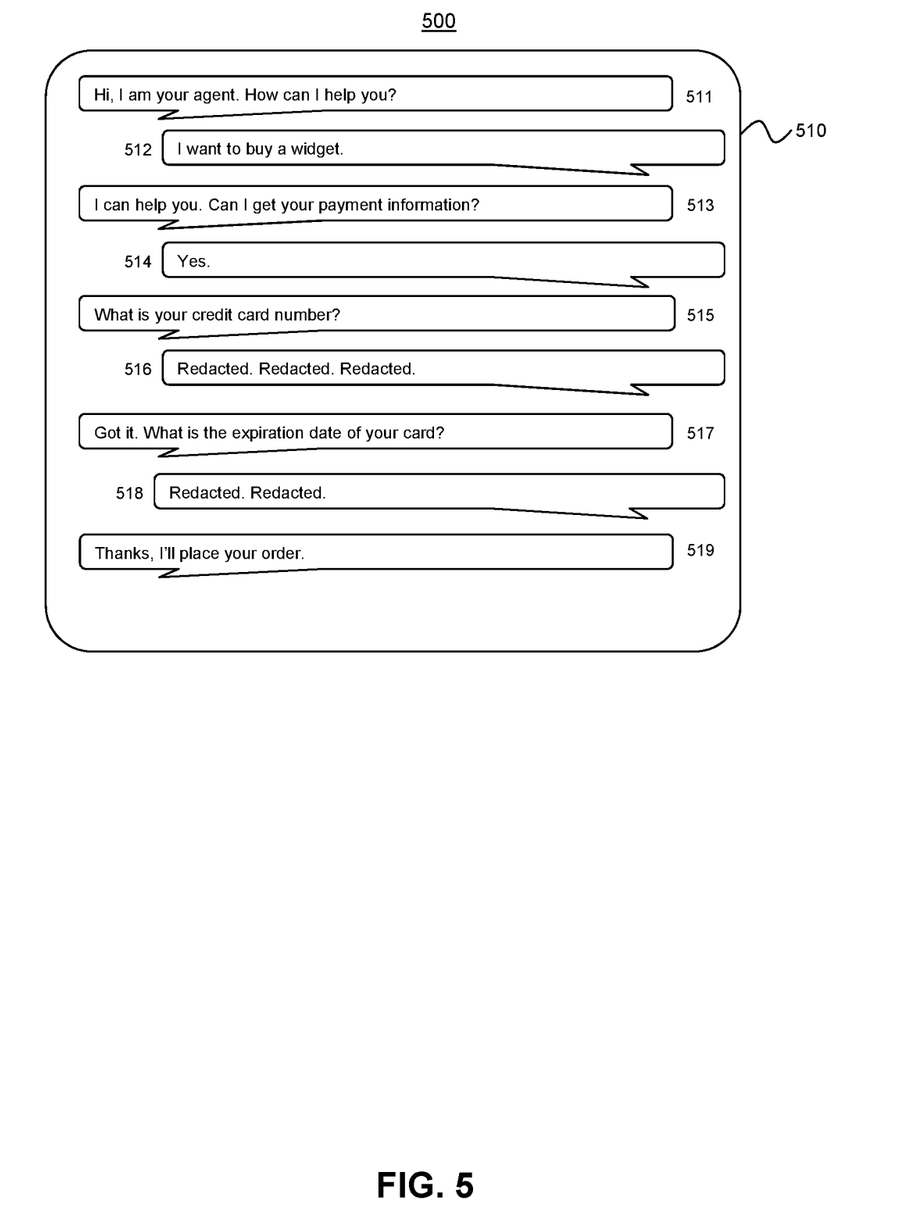
FIG. 5 is an example of a redacted conversation between an agent and a customer.

FIG. 5 is an example 500 of a redacted conversation 510 between an agent and a customer. Referring to FIGS. 2, 3, 4, and 5 together, the redacted conversation 510 begins with the agent making the statement 511 of "Hi, I am your agent. How can I help you?" The redacted conversation 510 continues with the customer responding with the statement 512 of "I want to buy a widget." Next, the agent makes the statement 513 of "I can help you. Can I get your payment information?" Then the customer responds with the statement 514 of "Yes."

The redacted conversation 510 continues with the agent making the statement 515 of "What is your credit card number?" In the original conversation 310, the customer had responded with an utterance 316 of "It is 9999-9999-9999-9999." However, as indicated in the table 400 at row 426 and column 415, this statement was redacted. Accordingly, the redacted conversation 510 has a redaction message 516 of "Redacted. Redacted. Redacted." After the redaction message 516 ends, the redacted conversation 510 continues with the agent making the statement 517 of "Got it. What is the expiration date of your card?" In the original conversation 310, the customer had responded with an utterance 318 of "It says January 2020." However, as indicated in the table 400 at row 428 and column 415, this statement was redacted. Accordingly, the redacted conversation 510 has a redaction message 518 of "Redacted. Redacted."

After the redaction message 518, the redacted conversation 510 ends with the agent making the statement 519 of "Thanks, I'll place your order." The redacting module 150 stores the redacted version of the redacted conversation 510 as redacted audio data 295. It is to be understood that the illustration of a redacted conversation 510 illustrates that any party may replay and listen to the redacted conversation 510 without the risk of listening to sensitive information of the customer.

Embodiments of the present disclosure provide highly efficient, effective, and versatile systems and methods for sensitive audio event redaction. However, the disclosed embodiments do not encompass, embody, or preclude other forms of innovation in the area of call recording systems and methods.

In addition, the disclosed embodiments of systems and methods for sensitive audio event redaction are not abstract ideas for at least several reasons.

First, the disclosed systems and methods for sensitive audio event redaction are not abstract ideas because they are not merely an idea itself (e.g., can be performed mentally or using pen and paper). For example, with a traditional call center system, the muting of a portion of a call is a physical action of depressing a mute button that is performed by a call center agent. It is not feasible to mentally cause a portion of a recording of a conversation to become muted. Furthermore, traditional call center systems with mute buttons have demonstrated that call center agents typically are inconsistent in muting a conversation. For example, an inappropriate recording of sensitive information, such as a credit card number, may result when a call center agent fails to perform the task of muting a conversation when sensitive information is discussed.

Second, the disclosed systems and methods for sensitive audio event redaction are not abstract ideas because they are not a method of organizing human activity such as fundamental economic principles or practices (including hedging, insurance, mitigating risk); commercial or legal interactions (including agreements in the form of contracts; legal obligations; advertising, marketing or sales activities or behaviors; business relations); and managing personal behavior or relationships or interactions between people (including social activities, teaching, and following rules or instructions). In contrast, the disclosed embodiments redact sensitive information from an audio recording. For example, certain disclosed embodiments provide for utilizing timestamp data to determine portions of recordings to be redacted based on a detection of a sensitive audio event, such as a disclosure of a credit card number. Such does not organize the human activity of a call center agent, but rather enables the call center agent to focus on providing quality service to a customer without having to be concerned that the customer's sensitive information is being recorded.

Third, although mathematics may be used in the disclosed systems and methods for sensitive audio event redaction, the disclosed and claimed systems and methods are not abstract ideas because they are not simply a mathematical relationship/formula. In contrast, utilization of the disclosed embodiments results in the tangible effect of redacting sensitive information from a call recording based on detection of such sensitive information. In contrast, with a traditional call center system, agents are relied upon to mute conversations when sensitive information is discussed, which is known to be a relatively fallible process.

In addition, the disclosed systems and methods describe a practical application to improve the art of call recording by providing a technical solution to the technical problem of recording sensitive information of call center conversations.

In the discussion above, certain aspects of some embodiments include process steps and/or operations and/or instructions described herein for illustrative purposes in a particular order and/or grouping. However, the particular order and/or grouping shown and discussed herein is illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein does not limit the scope of the invention as claimed below. Therefore, numerous variations, whether explicitly provided for by the specification or implied by the specification or not, may be implemented by one of skill in the art in view of this disclosure.

What is claimed is:

1. A machine implemented method comprising:
receiving intent data including at least one keyword of at least one intent of a first user;
storing the intent data representing the at least one keyword of the at least one intent of the first user;
obtaining audio data representing a recording of a conversation between the first user and a second user;
processing the audio data to generate transcript data representing a transcription of the recording of the conversation;
processing the transcript data using a portion of the intent data to identify sensitive data representing sensitive information associated with the first user;
generating pause notification data based on the sensitive data;
generating resume notification data based on the sensitive data; and
redacting a portion of the audio data from the audio data based on a first response to the pause notification and a second response to the resume notification to generate redacted audio data representing a redacted version of the recording of the conversation.

2. The method of claim 1, wherein redacting the sensitive data from the audio data is further based on start timestamp data and stop timestamp data, wherein the start timestamp data represents a start time of the sensitive data and the stop timestamp data represents a stop time of the sensitive data.

3. The method of claim 1, wherein processing the transcript data using the portion of the intent data is processed via a natural language processing module comprising a detecting module configured to detect intents from the transcript data.

4. The method of claim 1, wherein obtaining the audio data is obtained via a smartphone module comprising a recording module configured to record conversations conducted via the smartphone module.

5. The method of claim 1, wherein redacting the sensitive data from the audio data comprises replacing a portion of the audio data associated with the sensitive data with a redaction audio message.

6. The method of claim 1, wherein obtaining the audio data is a relative real-time operation of obtaining the audio data and processing the audio data to generate the transcript data is a relative real-time generation of the transcript data.

7. A system comprising:
at least one processor; and
at least one memory coupled to the at least one processor, the at least one memory having stored therein instructions which when executed by any set of the at least one processor, perform a process, the process including:
receiving intent data including at least one keyword of at least one intent of a first user;
storing the intent data representing the at least one keyword of the at least one intent of the first user;
obtaining audio data representing a recording of a conversation between the first user and the second user;
processing the audio data to generate transcript data representing a transcription of the recording of the conversation;
processing the transcript data using a portion of the intent data to identify sensitive data representing sensitive information associated with the first user;
generating pause notification data based on the sensitive data;
generating resume notification data based on the sensitive data; and
redacting a portion of the audio data from the audio data based on a first response to the pause notification and a second response to the resume notification to generate redacted audio data representing a redacted version of the recording of the conversation.

8. The system of claim 7, wherein redacting the sensitive data from the audio data is further based on start timestamp data and stop timestamp data, wherein the start timestamp data represents a start time of the sensitive data and the stop timestamp data represents a stop time of the sensitive data.

9. The system of claim 7, wherein processing the transcript data using the portion of the intent data is processed via a natural language processing module comprising a detecting module configured to detect intents from the transcript data.

10. The system of claim 7, wherein obtaining the audio data is obtained via a smartphone module comprising a recording module configured to record conversations conducted via the smartphone module.

11. The system of claim 7, wherein redacting the sensitive data from the audio data comprises replacing a portion of the audio data associated with the sensitive data with a redaction audio message.

12. The system of claim 7, wherein obtaining the audio data is a relative real-time operation of obtaining the audio data and processing the audio data to generate the transcript data is a relative real-time generation of the transcript data.

13. A computing system implemented method comprising:
receiving intent data including at least one keyword of at least one intent of a first user;
storing the intent data representing the at least one keyword of the at least one intent of the first user;
obtaining audio data representing a recording of a conversation between the first user and a second user;
processing the audio data to generate transcript data representing a transcription of the recording of the conversation;
processing the transcript data using a portion of the intent data to identify sensitive data representing sensitive information associated with the first user;
generating pause notification data based on the sensitive data;
generating resume notification data based on the sensitive data; and
redacting a portion of the audio data from the audio data based on a first response to the pause notification and a second response to the resume notification to generate redacted audio data representing a redacted version of the recording of the conversation.

14. The computing system implemented method of claim 13, wherein redacting the portion of the audio data from the audio data is based on start timestamp data and stop timestamp data, wherein the start timestamp data is generated based on the response to the pause notification, the start timestamp data representing a time of the first response, and wherein the stop timestamp data is generated based on the response to the resume notification, the stop timestamp data representing a time of the second response.

15. The computing system implemented method of claim 13, wherein processing the transcript data using the portion of the intent data is processed via a natural language processing module comprising a detecting module configured to detect intents from the transcript data.

16. The computing system implemented method of claim 13, wherein obtaining the audio data is obtained via a smartphone module comprising a recording module configured to record conversations conducted via the smartphone module.

17. The computing system implemented method of claim 13, wherein the first response to the pause notification data is delivered from a smartphone module.

18. The computing system implemented method of claim 13, wherein redacting the portion of the audio data from the audio data comprises replacing the portion of the audio data with a redaction audio message.

19. The computing system implemented method of claim 13, wherein obtaining the audio data is a relative real-time operation of obtaining the audio data and processing the audio data to generate the transcript data is a relative real-time generation of the transcript data.

20. The computing system implemented method of claim 13, wherein the conversation between the first user and the second user is associated with a data management system.

* * * * *